United States Patent [19]

Allaria et al.

[11] Patent Number: 4,651,428
[45] Date of Patent: Mar. 24, 1987

[54] PRESSURISED RESERVOIR CLOSURE DEVICE

[75] Inventors: Alain P. Allaria, La Rochette; Jacques G. Druet, Champigny sur Yonne, both of France

[73] Assignee: Societe Nationale D'Etude et De Construction De Moteurs D'Aviation, Paris, France

[21] Appl. No.: 825,900

[22] Filed: Feb. 4, 1986

[30] Foreign Application Priority Data

Feb. 6, 1985 [FR] France ............................ 85 01617

[51] Int. Cl.⁴ .............................................. G01F 23/04
[52] U.S. Cl. ............................................. 33/126.7 R
[58] Field of Search ................... 33/126.7 R; 220/205, 220/361; 116/227

[56] References Cited

U.S. PATENT DOCUMENTS

| | | | |
|---|---|---|---|
| 1,972,543 | 9/1934 | Emerol | 220/205 |
| 1,988,181 | 1/1935 | Spaeth | 33/126.7 R |
| 2,233,325 | 2/1941 | Raines | 33/126.7 R |
| 2,616,583 | 11/1952 | Rausenberger | 220/205 |
| 3,338,457 | 8/1967 | Tygenhof | 126/227 |
| 3,722,102 | 3/1973 | Jackson et al. | 33/126.7 R |
| 4,368,579 | 1/1983 | Bauer | 33/126.7 R |
| 4,480,470 | 11/1984 | Tussing | 33/126.7 R |
| 4,531,293 | 7/1985 | Grinde | 33/126.7 R |

FOREIGN PATENT DOCUMENTS 499206 2/1920 France .
2500412 8/1982 France .

Primary Examiner—Willis Little
Attorney, Agent, or Firm—Oblon, Fisher, Spivak, McClelland & Maier

[57] ABSTRACT

Closure device for a pressurized reservoir comprising a two part cap, an upper locking part and a lower seal part on the base of which is mounted a rigid rod constituting measuring means. A resilient disc is displacabl to seal off a lower, apertured base of a casing of the device and lies, on the face of the base directed towards an associated reservoir. A tube traversing the base of the casing and parallel to the axis of the casing has the end adjacent to the base of the reservoir which carries a valve of which the opening is controlled by the end of the rigid rod. Opening of the valve permit inlet of liquid from the reservoir to enable the rod to be used to measure the level of liquid.

10 Claims, 4 Drawing Figures

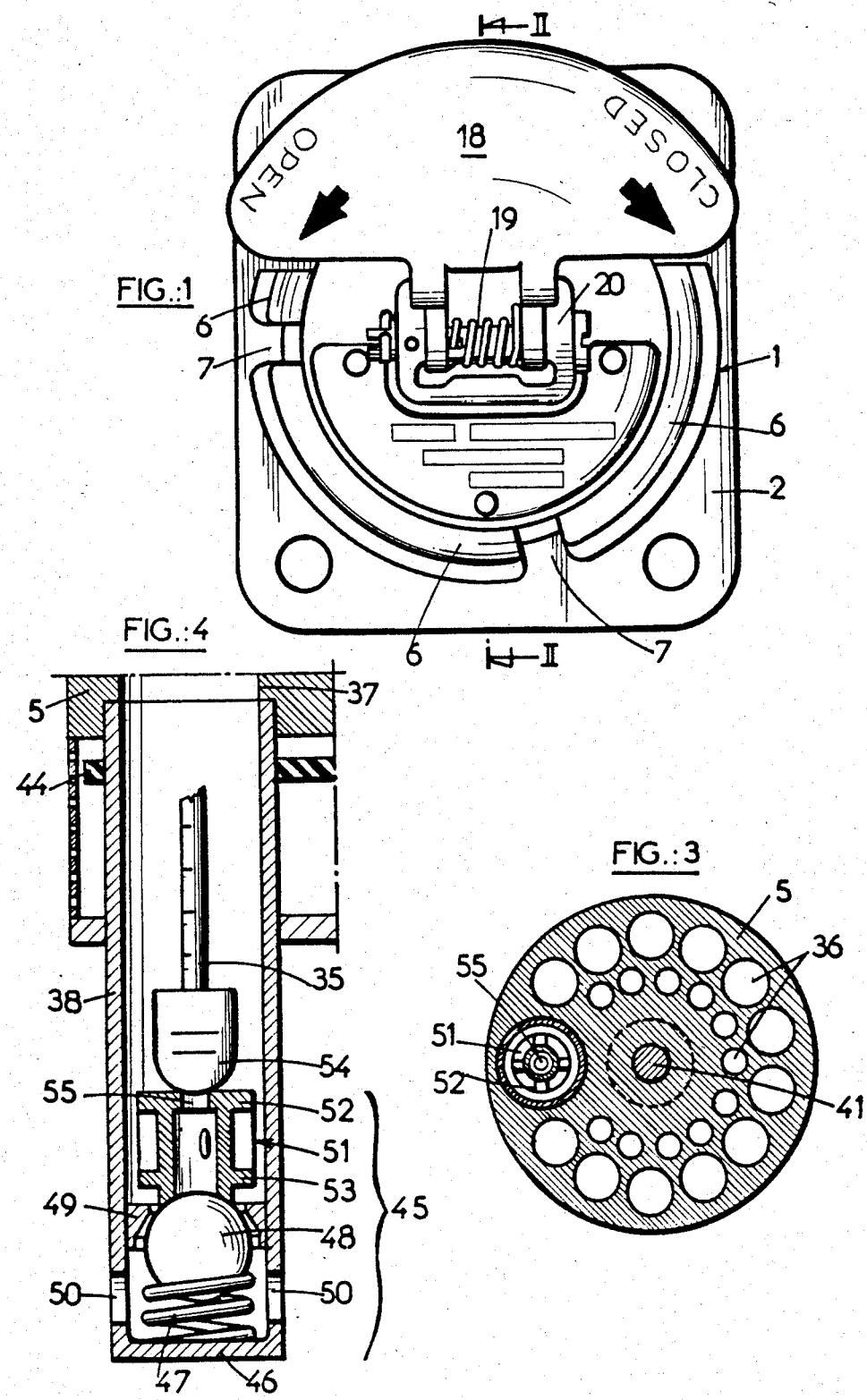

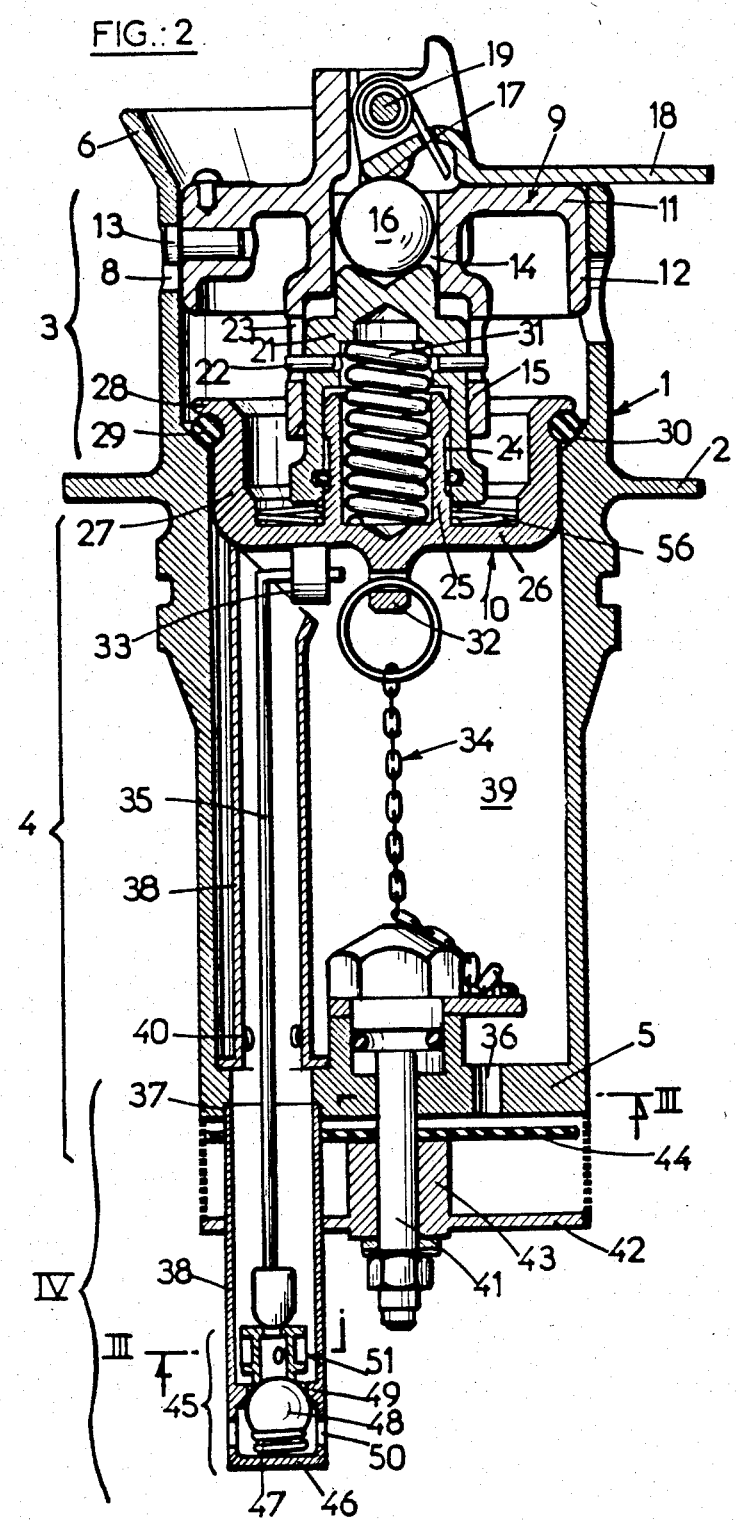

PRESSURISED RESERVOIR CLOSURE DEVICE

BACKGROUND OF THE IVENTION

1. Field of the Invention

The invention relates to a pressurized reservoir closure device incorporating manual measurement means.

2. Summary of the Prior Art

Reservoirs for oil or other liquids, used in particular in aircraft propelled by jet engines, are subject during operation of the engine to a degree of pressurization.

The sealing at the filling opening is conventionally provided by a lockable cap, but only assuming that the locking is effective. It is therefore necessary to take precautions against the possibility of the omission to replace the cap or, alternatively, ineffective locking. In this eventuality, when the engine is started, or the supply circuit of the reservoir is operative, there will be an at least partial expulsion of fluid contained within the reservoir, which will have serious consequences for the longevity of the engine or for its environment. Various proposals have been put forward based on electromechanical or mechanical devices. Electro-mechanical devices indicating the positive closure of the reservoir are not always satisfactory or are too costly. A mechanical solution is proposed in No. FR-A-2 500 412 and consists of a device for closure of the reservoir under pressure. The device includes a cylindrical casing secured in the opening of the reservoir. The casing is closed by a cap traversed by a pin carrying at one end a locking plate which is brought by rotational action into locking engagement beneath an internal flange of the casing, the other end of the pin being provided with a lever which, in the position corresponding to the locking position, comes into engagement with a recess of the cap. The cap is attached by a conventional retention device to the casing so that it cannot be lost when it is not engaged in the opening of the casing. The bottom of the casing carries a rod of a piston which can be displaced into the lower part of the casing. The end of the rod is provided with a compression spring and a sealing member which is capable of being applied against the bottom of the casing and to close off passages traversing the casing and discharging above that part of the casing serving as the piston chamber. The spring, in its rest position, holds the sealing member spaced from the bottom of the casing in order to enable the passage of liquid for refilling purposes.

During start-up of the engine, a duct discharging into a chamber formed below the piston feeds liquid under pressure which displaces the piston against the action of the spring towards the opening of the casing and drives the seal member into tight contact with the bottom of the casing.

The device ensures substantial security in use, but unfortunately, it includes numerous mechanical parts which substantially reduce the section of the passage for the oil during refilling of the reservoir and moreover, renders the device costly to produce; furthermore, it requires use of a liquid under pressure possibly supplied through a duct connected to a pressure generator which is started up before or during use of the reservoir fluid.

The invention is concerned with the production of a closure for a pressurized reservoir comprising a limited number of parts, the device enabling, furthermore, the control of the fluid level contained within the reservoir and the withdrawal of a sample.

SUMMARY OF THE INVENTION

According to the present invention there is provided a pressurized-reservoir closure device incorporating level measuring means, said device comprising a hollow cylindrical casing arranged to be mounted in a wall of the reservoir and serving as a filling opening, said casing including a base with openings therein providing communication with the reservoir, and means for closing off the openings in the casing base, said means including a resilient disc movable against said openings in the base of the casing from the outside of the casing, a lockable cup assembly serving to close off the hollow cylindrical casing, said cup assembly comprising, an upper, locking part engageable with an upper portion of the casing, a lower, seal, part arranged to seal off the casing against passage of liquid under pressure within the reservoir, a rigid rod secured to the lower seal part, extending within the casing and serving as a liquid level indicator and an elongate tube traversing the said base of the casing, and containing said rigid rod, said tube having at its lower end, beyond said base, a valve operable by said rod, the valve being in an open configuration when the seal part of the cap assembly is in its operative location.

BRIEF DESCRIPTION OF THE DRAWINGS

FIG. 1 is a plan view of a closure device in accordance with the invention.

FIG. 2 is a longitudinal section on the line II—II of FIG. 1.

FIG. 3 is a longitudinal section, to an enlarged scale, on line III—III of FIG. 2; and FIG. 4 is a longitudinal section, to an enlarged scale, of a part indicated by IV in FIG. 2.

DESCRIPTION OF THE PREFERRED EMBODIMENT

Referring now to the drawings, a closure device in accordance with the invention (FIGS. 1 and 2) comprises a cylindrical casing 1 provided with a flange 2 intended to be secured to material surrounding the filling opening of a reservoir which is pressurised during the start-up of an engine or by a pressurizing system utilising the liquid which is contained therein. The flange 2 is sealed in a manner know per se, to the material defining the periphery of the opening by bolts (not shown), for example. The flange 2 defines a boundary between two parts of the casing; a part 3 extending beyond the reservoir and forming the filling orifice for the reservoir fluid and a part 4 located within the reservoir and including a base 5. The part 3 has around a part of the periphery of the filling orifice, a conical collar 6 having grooves 7 extending axially of the casing, which are not regularly equally spaced in order to prevent any error in the mounting of the cap, and which extend into the cylindrical part of the casing. The lower ends of the grooves 7 have at a transverse slot 8 or other opening extending circumferentially from right to left and defining a closure position as will be hereinafter explained. Within the interior of the filling opening, the cap is engaged and this has at least two parts: an upper locking part 9 and a lower seal part 10.

The upper part 9 includes a cylindrical member comprising a base 11 and a circular skirt 12, directed towards the interior of the reservoir, having an external diameter approximately equal to that of the internal cross-section of the filling opening and carrying at its periphery headed-pins 13 in an angular disposition the same as that of the grooves 7 and arranged to cooperate with the slots 8 provided in the grooves 7. The base 11 has a central portion defining a bore 14 extending from the same side of the base as the skirt 12 and this central portion is further extended by a tubular part 15. A ball 16 located in the bore 14 is held from one direction by the end, in the form of a cam 17, of a lever 18, pivoted by a pin 19 secured in a bearing assembly 20 formed in the face of the opposite base 11 and, from the other direction is supported by an upper end of a part 21 slidable within the extension 15. The part 21 carries two diametrically-opposed pins 22 cooperating with longitudinal groove 23 provided in the tubular extension part 15. The other end of the part 21 has a bore 24 in which a tubular extension 25 of the lower seal part 10 can slide.

The seal part 10 comprises a base 26 and a circular skirt 27 directed towards the filling opening (thus in an inverted sense to that of the skirt 12 of the upper locking part 9). The skirt has a collar or flange 28 at its upper edge beneath which an O-ring seal 29 is located. The part of the wall of the cylindrical casing 1 arranged to cooperate with the seal 29 has a frusto-conical surface 30, connecting with the smaller bore of part 4 located in the reservoir. A compression spring 31 is disposed between the lower seal part 10 and the sliding part 21, in the tubular extension 25, so that the upper locking part 9 is resiliently biased against the lower seal part 10 and more particularly the seal 29 against the sealing surface 30, the pressure being directed towards the interior of the reservoir.

The pressure force is increased at the end of the locking motion by the compression of Bellerille washers 56 caused by the force exerted on the sliding part 21, when the lever 18 is depressed, through the intermediary of the cam 17 and of the ball 16.

The lower seal part 10 carries on the face of the base 26 directed inwardly of the reservoir, securing means 32 and 33 respectively of connecting means 34 at the bottom of the casing and of rigid rod 35 forming a measurement means extending parallel to the longitudinal axis of the closure device.

The connecting means 34 takes the form of a light chain secured by one of its ends to a coupling means rigid with the base 5 of the casing 1.

The base 5 of the casing 1 (FIG. 3) is provided with two substantially annular series of holes 36 enabling flow into the fluid reservoir introduced through the opening of the closure device. The base as furthermore adjacent ot its wall, a circular opening 37 in which is secured in a fluid-tight manner a tube 38 extending parallel to the axis of the casing. The tube extends towards the bottom of the reservoir and is intended, inter alia, to provide for the passage and the guidance of the measurement device 35. The tube 38 extends upwardly into a chamber 39 formed between the base of the casing and the lower seal part 10 of the cap. The part of the tube located in the chamber 39 has openings 40 providing communication between the tube and the chamber.

The base 5 of the casing 1 comprises at its center a securing bolt 41 which supports a filtration housing 42 having a diameter corresponding substantially to the diameter of the casing 4.

The center piece 43 secured to the bottom and within the filtration housing supports closure means 44 constituted by a resilient disc (for example of elastomer) capable of displacement along the axis of the casing on the shank of the bolt 41 so as to abut beneath the base 5 and to close the openings 36, under the action of pressure exerted from the reservoir towards the opening of the casing. The disc 44 is provided with an aperture to enable the passage of the tube 38.

The end of the tube 38 adjacent to the bottom of the reservoir carries a ball valve 45 which is normally closed in the direction reservoir-tube. The tube 38 is closed at its end by a base 46 against which rests a compression spring 47 which biases the ball 48 on to a seat 49. The chamber formed between the wall 46 and the seating 49 communicates with the reservoir through openings 50.

A spider 51, having centering rings 52, 53, enabling it to be centered within the tube 38, comes to rest at one of its ends on the part of the ball 4 engaged in the opening of the seat 49. The other end of the spider 51 is arranged to cooperate with a lower end 54 enlargement of the measuring device 35 so as to transmit pressure acting on the ball 49 against the action of the spring 47 in order to permit the fluid contained within the reservoir to enter into the tube 38 and into the chamber 39 and thus to indicate on the measuring device 35 the level at any given time. The spider can be constituted in more general terms by a hollow thrust member enabling the passage of oil.

The mode of operation of the closure device hereinbefore described is as follows:

During filling of the reservoir, the cap assembly 9-10 which has previously been withdrawn remains attached by the chain 34, the filling fluid, for example engine oil, being suppied through the opening of the casing 1 and enters into the chamber 39 from where it flows through openings 36 in the base 5 into the filtration housing 42, after having displaced the resilient disc 44, and then into the reservoir. The ball valve 45 is closed, no counter pressure whatever being capable of acting on the spider 51 in order to force the ball 49 against the action of the spring 47.

The various parts constituting the cap, when the latter is not in operation or when it is withdrawn from the opening, will be found in the locations or relative positions as follows:

The lever 18 being in the vertical position, the end 17 of the lever is no longer applied to the ball 16 which for this reason returns to the upper part of the bore 14 and thus permits free longitudinal displacement of the sliding part 21 which carries the lower seal part 10 and enables it to approach closest to the upper locking part 9.

When the filling has been effected and it is desired to reclose the reservoir, the measuring device 36, secured to the cap is introduced into the tube 38 in which it is guided and the cap assembly is offered up to the opening. The seal 29 of the lower seal part 10 is spaced from the conical surface 30, with which it is necessary to provide the fluid tight seal, as a result of the abutment of the lower end of the measurement member 35 against the spider 51 which is supported by the ball 58 resting against its seal 49 under the action of the spring 47. The pin heads 13 of the upper locking part 9 are located opposite to the groove 7 of the part 3 of the casing. The locking part 9 is then displaced axially into the opening until the heads 13 abut against the bottom of the grooves 7 and then it is subjected to rotation from the right to the left in order to bring the heads into the base of the slots 8.

The lever 18 is then lowered. The cam 17 of the lever then comes into contact with the ball 16 which presses against the end of the sliding part 21 which acts agains the resilient Belleville washers 56 and on one end of the spring 31 in order to force down the lower part 10 so as to bring it into contact with the seal 29 of the conical sealing surface 30. Simultaneously, the end of the measurement device 35 applied forcefully against the spider 51 forces back the ball 48 of the valve and enables the passage of oil from the reservoir into the tube 38 of the chamber 39. It is then possible, by unlocking the cap, the engine being supported or at tick-over, to inspect the level indicated by the measuring device.

In order to provide a sample from the reservoir by means of the tube 38 filled with oil when the cap and the mesuring device are free of the opening a flexible tube is introduced into the tube 38.

If as a result of an incomplete motion of the lever 18 the cap assembly is improperly closed and opens itself, or if replacement of the cap is forgotten, the measuring device 35 will no longer be applied against the spider 51, the ball of the valve remains applied against its seating 49 and prevents any communication between the reservoir and the tube 38. Furthermore, the pressure existing in the reservoir during operation of the engine results in forcing of the resilient disc 44 against the openings 36 of the base 5 of the casing and thus to block off these openings while preventing any raising of the oil into the chamber 39 and its possible ejection to the ambient.

According to the example illustrated, the spider 51 has been provided which transmits the thrust of the measuring device to the ball 48 in order to open the valve; the same result can be provided by causing direct cooperation between of the end of the measuring device 35 and the ball 48. The spider 51 has for its primary function to prevent the obstruction of the sampling tube while avoiding its end coming into contact with the ball. In order to enable sampling despite contact of the sampling tube and the spider, a central opening 55, communicating at least with a space lying between the parts of the spider, is provided in order to enable the passage of oil.

The device in accordance with the invention enables in addition to automatic sealing during operation when the cap is not locked, an indication of the oil level without necessity for indicating the associated actual level, and the sampling of the oil or other liquid from an enclosure capable of being isolated from the reservoir.

What is claimed is:

1. A pressurized-reservoir closure device incorporating level measuring means, said device comprising
   a hollow cylindrical casing arranged to be mounted in a wall of the reservoir and serving as a filling opening, said casing including
   a base with openings therein providing communication with the reservoir, and
   means for closing off the openings in the casing base, said means including
   a resilient disc movable against said openings in the base of the casing from the outside of the casing,
   a lockable cap assembly serving to close off the hollow cylindrical casing, said cap assembly comprising,
   an upper, locking part engageable with an upper portion of the casing,
   a lower, seal, part arranged to seal off the casing against passage of liquid under pressure within the reservoir,
   a rigid rod secured to the lower seal part, extending within the casing and serving as a liquid level indicator, and
   an elongate tube transversing the said base of the casing and, containing said rigid rod, said tube having at its lower end, beyond said base,
   a valve operable by said rod,
   a valve being in an open configuration when the seal part of the cap assembly is in its operative location.

2. A device according to claim 1 wherein said lower, seal, part comprises
   a circular base,
   an annular skirt extending from the base and having an annular edge portion remote from said circular base, and
   an O-ring seal mounted on said annular edge portion said casing defining a seal surface which in the operative configuration co-operates with said O-ring seal of the lower, seal, part.

3. A device according to claim 2, wherein said circular base comprises
   a tubular extension co-axial with said annular skirt, and said upper, locking part comprises
   a sliding part,
   means for retaining the sliding part for limited motion, said sliding part being movable relatively to said tubular extension of the lower, seal part,
   resilient means biasing the said sliding part and the lower seal part away from one another, and
   means operable from externally of the associated reservoir for overcoming the said resilient menas, whereby to move said rigid rod into engagement with and to open the valve at the lower end of the elongate tube to enable liquid from the reservoir to enter the tube.

4. A device according to claim 3, wherein said resilient means comprise
   a compression spring mounted within said tubular extension and extending to engage said sliding part and
   Belleville washers mounted on the inside of the base of the seal part and acting on an end surface of the sliding part.

5. A device according to claim 1 wherein said valve operable by the rigid rod is a ball valve.

6. A device according to claim 5, wherein the ball valve comprises
   a ball,
   a seating means mounted within the tube,
   a spring biasing the ball to engagement with the seating, and
   a spider engaging the ball on the side thereof opposite to the spring and being itself directly engaged by the rigid rod.

7. A device according to claim 6, wherein the spider has two spaced parts defining an internal space and an aperture providing communication to the internal space from that part of the spider arranged to contact the rigid rod.

8. A device according to claim 1, wherein the base of the casing carries
   a filtration unit,
   means securing the unit to the base, and
   means on the filtration unit which serve to support said resilient disc,
   the resilient disc being movable on the support means into and out of engagement with the openings in the base of the casing.

9. A device according to claim 8, wherein the resilient disc is made of an elastomer.

10. A pressurized reservoir closure device comprising a generally cylindrical casing arranged to be mounted in a wall of an associated reservoir, said casing having a base lying within the reservoir, a closure cap assembly including an outer, locking, part movable in an outer end portion of the casing and which can be disengaged therefrom, an inner, seal, part which can co-operate with a portion of the casing to seal the reservoir, means biasing the parts away from one another, and level measuring means rigid with the inner, seal, part, an elongate tube extending within the casing and through the said base thereof, and valve means at the end of the tube remote from the said seal part, the valve means being operable by the level measuring means to admit liquid to the tube when the seal is in its operative configuration.

* * * * *

UNITED STATES PATENT AND TRADEMARK OFFICE
CERTIFICATE OF CORRECTION

PATENT NO. : 4,651,428

DATED : MARCH 24, 1987

INVENTOR(S) : ALAIN P. ALLARIA and JACQUES G. DRUET

It is certified that error appears in the above-identified patent and that said Letters Patent is hereby corrected as shown below:

In the TITLE, change "PRESSURISED" to --PRESSURIZED--.
Column 1, line 1, change "PRESSURISED" to --PRESSURIZED--.
In the ABSTRACT, line 4, change "displacabl" to --displaceable--;

line 6, change "lies," to --lies--;

line 11, change "permit" to --permits--.

In column 1, line 60, change "renders" to --render--.

In column 2, line 4, change "pressurized-reservoir" to --pressurized reservoir--;

line 14, change "comprising, an upper," to --comprising an upper--;

line 16, change "lower, seal," to --lower seal--;

line 42, change "pressurised" to --pressurized--;

line 44, change "utilising" to --utilizing--;

line 45, change "know" to --known--;

line 47, change "boundrary" to --boundary--;

line 48, change "casing;" to --casing,--;

line 67, change "cross-section" to --cross section--;

UNITED STATES PATENT AND TRADEMARK OFFICE
CERTIFICATE OF CORRECTION

PATENT NO. : 4,651,428

DATED : MARCH 24, 1987

INVENTOR(S) : ALAIN P. ALLARIA and JACQUES G. DRUET

It is certified that error appears in the above-identified patent and that said Letters Patent is hereby corrected as shown below:

In column 2, line 68, change "disposition" to --disposition,--.

In column 3, line 1, delete "and";

line 13, change "groove" to --grooves--;

line 23, change "of part" to --of the part--;

line 28, change "29 against" to --29 is resiliently biased against--;

line 32, change "Bellerille" to --Belville--;

line 39, change "of rigid" to --of a rigid--;

line 48, change "as" to --has--;

line 49, change "ot" to --to--.

In column 4, line 9, change "on to" to --onto--;

line 31, change "suppied" to --supplied--;

line 32, change "enters" to --entering--;

line 56, change "fluid tight" to --fluid-tight--;

line 60, change "pin heads" to --pinheads--;

line 61, change "groove" to --grooves--.

UNITED STATES PATENT AND TRADEMARK OFFICE
CERTIFICATE OF CORRECTION

PATENT NO. : 4,651,428

DATED : MARCH 24, 1987

INVENTOR(S) : ALAIN P. ALLARIA and JACQUES G. DRUET

It is certified that error appears in the above-identified patent and that said Letters Patent is hereby corrected as shown below:

In column 5, line 1, change "agains" to --against--;

line 2, change "Belleville" to --Belville--;

line 3, change "lower part" to --lower seal part--;

line 10, change "supported" to --stopped--;

line 14, change "opening" to --opening,--; also change "mesuring" to --measuring--;

line 34, delete "between";

line 36, change "its end coming" to --having its end come--;

line 50, change "pressurized-reservoir" to --pressurized reservoir--;

line 64, change "upper," to --upper--;

line 66, change "lower, seal," to --lower seal--.

In column 6, line 4, change "transversing" to --traversing--;

line 8, change "a" to --the--;

line 10, change "lower," to --lower--;

line 11, change "seal," to --seal--;

UNITED STATES PATENT AND TRADEMARK OFFICE
CERTIFICATE OF CORRECTION

PATENT NO. : 4,651,428

DATED : MARCH 24, 1987

INVENTOR(S) : ALAIN P. ALLARIA and JACQUES G. DRUET

It is certified that error appears in the above-identified patent and that said Letters Patent is hereby corrected as shown below:

In column 6, line 18, change "co-operates" to --cooperates--;

line 19, change "lower, seal," to --lower seal--;

line 22, change "co-axial" to --coaxial--;

line 23, change "upper, locking" to --upper locking--;

line 27, change "lower, seal" to --lower seal--;

line 41, change "Belleville" to --Belville--.

In column 7, line 10, change "outer, locking," to --outer locking--.

In column 8, line 1, change "inner, seal, part which can co-operate" to --inner seal part which can cooperate--;

line 5, change "inner, seal," to --inner seal--;

line 12, change "seal" to --seal part--.

Signed and Sealed this

Ninth Day of January, 1990

Attest:

JEFFREY M. SAMUELS

Attesting Officer     Acting Commissioner of Patents and Trademarks